United States Patent
Komada

(10) Patent No.: US 11,203,394 B2
(45) Date of Patent: Dec. 21, 2021

(54) BICYCLE HYDRAULIC DEVICE

(71) Applicant: Shimano Inc., Osaka (JP)

(72) Inventor: Yasuyuki Komada, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/496,108

(22) Filed: Apr. 25, 2017

(65) Prior Publication Data

US 2018/0304960 A1 Oct. 25, 2018

(51) Int. Cl.
*B62L 3/02* (2006.01)
*B62K 23/06* (2006.01)

(52) U.S. Cl.
CPC ............. *B62L 3/023* (2013.01); *B62K 23/06* (2013.01)

(58) Field of Classification Search
CPC .......... B62L 3/023; B62K 23/06; B60T 7/102
See application file for complete search history.

(56) References Cited

U.S. PATENT DOCUMENTS

| | | | | |
|---|---|---|---|---|
| 3,802,200 A * | 4/1974 | Kolm | ...................... | B62L 3/023 60/588 |
| 7,461,724 B2 * | 12/2008 | Nago | .................... | B60T 11/165 188/2 D |
| 8,944,223 B2 * | 2/2015 | Miles | ...................... | B62L 3/023 188/344 |
| 2011/0147149 A1 * | 6/2011 | Ka | ............................. | B62L 1/10 188/344 |
| 2013/0031998 A1 * | 2/2013 | Miki | ...................... | B62M 25/04 74/473.12 |
| 2016/0264213 A1 | 9/2016 | Swanson et al. | | |
| 2016/0327070 A1 * | 11/2016 | Fujiwara | ................ | B62M 25/04 |
| 2017/0088234 A1 * | 3/2017 | Komada | ................ | B62K 23/06 |

FOREIGN PATENT DOCUMENTS

| | | | |
|---|---|---|---|
| DE | 10 2010 020 600 A1 | 11/2011 | |
| DE | 20 2013 100 306 U1 | 1/2013 | |
| DE | 10 2013 021 515 A1 | 6/2014 | |
| JP | 09277924 A * | 10/1997 | ............. B62L 3/023 |

* cited by examiner

*Primary Examiner* — Xuan Lan Nguyen
(74) *Attorney, Agent, or Firm* — Global IP Counselors, LLP

(57) ABSTRACT

A bicycle hydraulic device is basically provided with a base member, a piston, a guide rod and a guide rod seal ring. The base member includes a main body having a cylinder bore and a guide bore. The piston is movably disposed in the cylinder bore. The guide rod is coupled to the piston to move the piston. The guide rod is movably disposed in the guide bore. The guide rod seal ring is disposed on the guide rod and in sliding contact with the guide bore.

15 Claims, 7 Drawing Sheets

BICYCLE HYDRAULIC DEVICE

BACKGROUND

Field of the Invention

This invention generally relates to a bicycle hydraulic device. More specifically, the present invention relates to a bicycle hydraulic device having a piston.

Background Information

In recent years, some bicycles are provided with one or more hydraulically operated components. For example, some bicycles are provided with a hydraulic braking system. The hydraulic braking system typically includes at least one hydraulic brake operating device (i.e., a hydraulic actuating device) and at least one hydraulic brake device (i.e., a hydraulically actuated device). The hydraulic brake operating device and the hydraulic brake device each typically includes a piston that is slidably disposed in a cylinder bore of a cylinder. The hydraulic brake operating device includes an operating member such as a brake lever to actuate the hydraulic brake device.

SUMMARY

Generally, the present disclosure is directed to various features of a bicycle hydraulic device (e.g., a hydraulic actuating (operating) device or a hydraulically actuated device).

In view of the state of the known technology and in accordance with a first aspect of the present disclosure, a bicycle hydraulic device is provided that basically comprises a base member, a piston, a guide rod and a guide rod seal ring. The base member includes a main body having a cylinder bore and a guide bore. The piston is movably disposed in the cylinder bore. The guide rod is coupled to the piston to move the piston. The guide rod is movably disposed in the guide bore. The guide rod seal ring is disposed on the guide rod and in sliding contact with the guide bore.

According to the first aspect of the present invention, the bicycle hydraulic operating device can be provided with a piston and a guide rod that increases the choices of materials and manufacturing methods.

In accordance with a second aspect of the present invention, the bicycle hydraulic device according to the first aspect is configured so that the guide rod has a guide rod recess. The guide rod seal ring is disposed in the guide rod recess.

According to the second aspect of the present invention, the position of the guide rod seal ring can be reliably maintained.

In accordance with a third aspect of the present invention, the bicycle hydraulic device according to the first or second aspect further comprises a piston seal ring disposed on the piston and in sliding contact with the cylinder bore.

According to the third aspect of the present invention, the piston seal ring can be relatively easy to install.

In accordance with a fourth aspect of the present invention, the bicycle hydraulic device according to the third aspect is configured so that the piston has a piston recess, and the piston seal ring is disposed in the piston recess.

According to the fourth aspect of the present invention, the position of the piston seal ring can be reliably maintained.

In accordance with a fifth aspect of the present invention, the bicycle hydraulic device according to any one of the first to fourth aspects is configured so that the guide rod is made of a resin material.

According to the fifth aspect of the present invention, the guide rod of the bicycle hydraulic operating device can be made lighter in weight.

In accordance with a sixth aspect of the present invention, the bicycle hydraulic device according to any one of the first to fifth aspects is configured so that the main body of the base member is made of a resin material.

According to the sixth aspect of the present invention, the base member of the bicycle hydraulic operating device can be made lighter in weight.

In accordance with a seventh aspect of the present invention, the bicycle hydraulic device according to any one of the first to sixth aspects is configured so that the piston and the guide rod are a single member.

According to the seventh aspect of the present invention, the piston and the guide rod can be easily manufactured.

In accordance with an eighth aspect of the present invention, the bicycle hydraulic device according to any one of the first to seventh aspects is configured so that the guide bore has a longitudinal length that is longer than a maximum stroke length of the piston in the cylinder bore.

According to the eighth aspect of the present invention, contact between the guide rod seal ring and the guide bore can be reliably maintained during the entire movement of the piston in the cylinder bore.

In accordance with a ninth aspect of the present invention, the bicycle hydraulic device according to any one of the first to eighth aspects is configured so that the guide bore has a longitudinal length that is equal to or greater than five millimeters.

According to the ninth aspect of the present invention, sufficient contact between the guide rod seal ring and the guide bore can be obtained.

In accordance with a tenth aspect of the present invention, the bicycle hydraulic device according to any one of the first to ninth aspects is configured so that the guide bore has a longitudinal length that is equal to or smaller than thirty millimeters.

According to the tenth aspect of the present invention, the stroke of the piston can be maintained in a suitable range.

In accordance with an eleventh aspect of the present invention, the bicycle hydraulic device according to any one of the first to tenth aspects is configured so that the guide bore of the main body has a smooth guide surface.

According to the eleventh aspect of the present invention, a reliable seal and a smooth relative movement can be obtained between the guide rod seal ring and the guide bore.

In accordance with a twelfth aspect of the present invention, the bicycle hydraulic device according to any one of the first to eleventh aspects is configured so that the base member includes a first end portion, a second end portion and a grip portion. The first end portion is configured to be mounted to a bicycle handlebar. The second end portion includes a pommel portion disposed opposite to the first end portion. The grip portion is disposed between the first end portion and the second end portion.

According to the twelfth aspect of the present invention, the rider can reliably grip the grip portion to allow the bicycle hydraulic device to be used for a road-type operating device.

In accordance with a thirteenth aspect of the present invention, the bicycle hydraulic device according to the twelfth aspect is configured so that the cylinder bore is provided in the grip portion.

According to the thirteenth aspect of the present invention, the bicycle hydraulic device can be relatively compact.

In accordance with a fourteenth aspect of the present invention, the bicycle hydraulic device according to the twelfth aspect is configured so that the cylinder bore is provided in the pommel portion.

According to the fourteenth aspect of the present invention, by providing the cylinder bore in the pommel portion, the grip portion can be smaller in size than if the cylinder bore is provided in the grip portion.

In accordance with a fifteenth aspect of the present invention, the bicycle hydraulic device according to any one of the first to fourteenth aspects is configured so that the base member includes a reservoir fluidly connected to the cylinder bore.

According to the fifteenth aspect of the present invention, the bicycle hydraulic operating device, by providing the reservoir, environmental change and wear of a friction member in an operated device are absorbed.

In accordance with a sixteenth aspect of the present invention, the bicycle hydraulic device according to any one of the first to fifteenth aspects further comprises an operating member movably coupled to the base member and operatively coupled to the piston to pull the piston in the cylinder bore from a non-actuated position to an actuated position in response to a movement of the operating member.

According to the sixteenth aspect of the present invention, the bicycle hydraulic device can be configured as an operating device for actuating a bicycle component.

In accordance with a seventeenth aspect of the present invention, the bicycle hydraulic device according to the sixteenth aspect is configured so that the operating member is pivotally coupled to the base member about a pivot axis.

According to the seventeenth aspect of the present invention, the bicycle hydraulic device can be configured to be easily operated from a bicycle handlebar.

In accordance with an eighteenth aspect of the present invention, the bicycle hydraulic device according to the sixteenth or seventeenth aspect further comprises a bicycle component operating unit provided on one of the base member and the operating member.

According to the eighteenth aspect of the present invention, the bicycle hydraulic device can be used to operate at least two different bicycle components.

In accordance with a nineteenth aspect of the present invention, the bicycle hydraulic device according to the eighteenth aspect further comprises an additional operating member operating the bicycle component operating unit.

According to the nineteenth aspect of the present invention, by providing the additional operating member, a rider can easily operate the bicycle component operating unit.

In accordance with a twentieth aspect of the present invention, the bicycle hydraulic device according to the nineteenth aspect is configured so that the operating member includes an operating lever that is pivotally coupled to the base member about a pivot axis. The additional operating member includes an additional operating lever pivotally coupled to one of the base member and the operating lever about an additional pivot axis. The component operating unit includes an electrical switch that is provided on one of the base member, the operating lever and the additional operating lever.

According to the twentieth aspect of the present invention, the bicycle hydraulic device can be configured to easily operate two different bicycle components from a bicycle handlebar.

Also, other objects, features, aspects and advantages of the disclosed bicycle hydraulic device will become apparent to those skilled in the art from the following detailed description, which, taken in conjunction with the annexed drawings, discloses illustrative embodiments of the bicycle hydraulic device.

BRIEF DESCRIPTION OF THE DRAWINGS

Referring now to the attached drawings which form a part of this original disclosure.

DETAILED DESCRIPTION OF EMBODIMENTS

Figure 1:
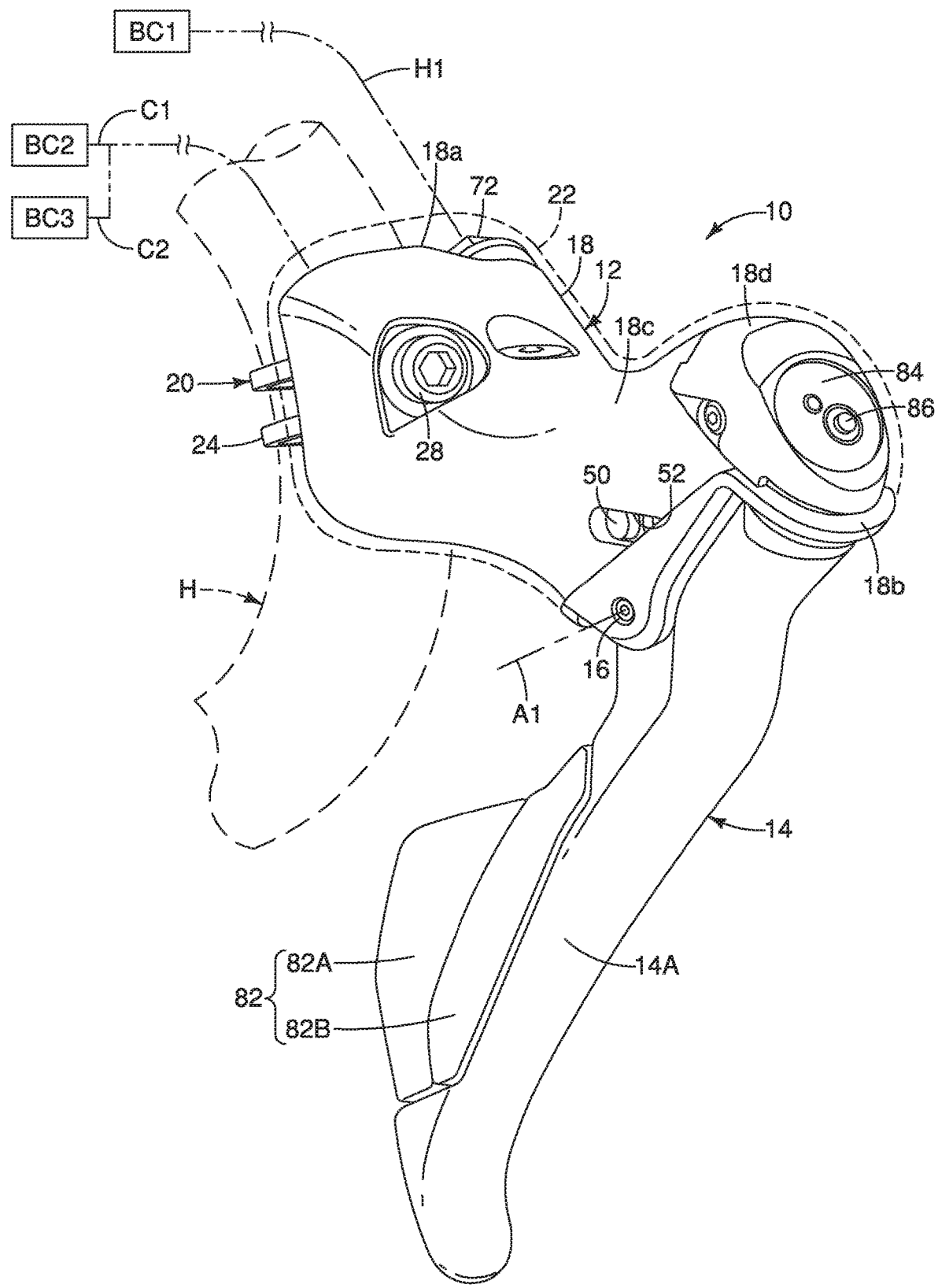
FIG. 1 is a perspective view of a portion of a drop handlebar and a bicycle hydraulic device in accordance with a first embodiment.
Figure 2:
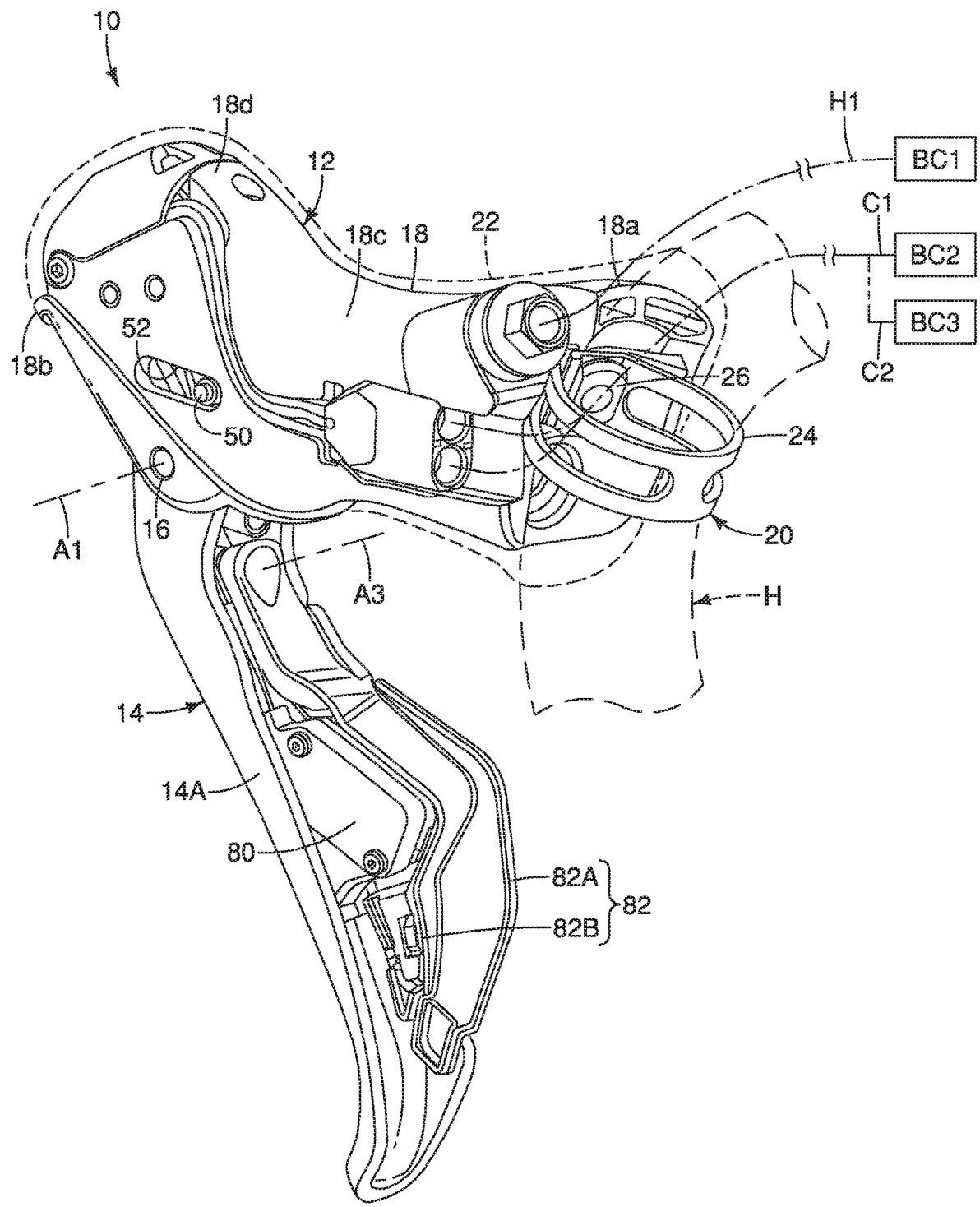
FIG. 2 is another perspective view of the portion of the drop handlebar and the bicycle hydraulic device illustrated in FIG. 1 in which the bicycle hydraulic device has an operating member that is in a non-operated or rest position.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Referring initially to FIGS. 1 to 4, a bicycle hydraulic device 10 is illustrated in accordance with a first embodiment. Here, in the first embodiment, the bicycle hydraulic device 10 is a hydraulic bicycle component operating/actuating/control device. However, broadly speaking, basic features of the bicycle hydraulic device 10 can be applied to other bicycle hydraulic devices such as a bicycle hydraulic disc brake. In the case of the bicycle hydraulic device 10 being a hydraulic bicycle component operating/actuating/control device, preferably, the bicycle hydraulic device 10 is configured to be mounted to a handlebar H. Specifically, in the first embodiment, the handlebar H is a drop handlebar that is fixed to an upper end of a front fork (not shown) in a conventional manner such as with a handlebar stein.

However, the bicycle hydraulic device 10 can be configured to be mounted to other types of handlebars such as a flat handlebar, a time trial handlebar and a bull horn handlebar.

Also, as diagrammatically illustrated in FIGS. 1 to 4, the bicycle hydraulic device 10 is operatively coupled to at least one device to operate the at least one device. Specifically, in the first embodiment, the bicycle hydraulic device 10 is operatively coupled to a hydraulic bicycle component BC1 such as a hydraulic brake device, and operatively coupled to an electrical bicycle component BC2 such as a bicycle transmission. Here, the bicycle hydraulic device 10 is also operatively coupled to an additional electrical bicycle component BC3 such as a bicycle height adjustable seatpost, a bicycle suspension or a cycle computer. The electrical bicycle component BC2 and/or the electrical bicycle component BC3 can be omitted if needed and/or desired. In other words, the bicycle hydraulic device 10 can be configured without the structure for operating the electrical bicycle component BC2 and/or the electrical bicycle component BC3.

Preferably, as in the first embodiment, the bicycle hydraulic device 10 is a rear shift/brake operating device that is mounted to a right-hand side on the handlebar H. However, the structures of the bicycle hydraulic device 10 can also be applied to a left-hand side operating device. The bicycle hydraulic device 10 is configured to operate/control the hydraulic bicycle component BC1 (e.g., a hydraulic brake device in the first embodiment) via a hydraulic hose H1. The bicycle hydraulic device 10 is configured to operate/control the electrical bicycle component BC2 (e.g., a bicycle transmission in the first embodiment) via a conventional electrical cable C1. The bicycle hydraulic device 10 is configured to operate/control the electrical bicycle component BC3 (e.g., a bicycle height adjustable seatpost in the first embodiment) via a conventional electrical cable C2. Alternatively, the bicycle hydraulic device 10 can be operatively coupled to at least one of the electrical bicycle components BC2 and BC3 via wireless communication. In case, in the first embodiment, the bicycle hydraulic device 10 is a right-hand side operating/control device that is configured to be operated by the rider's right hand to operate/control the hydraulic bicycle component BC1 and operate/control the electrical bicycle components BC2 and BC3.

As seen in FIGS. 1 to 4, the bicycle hydraulic device 10 comprises a base member 12. In the first embodiment, the bicycle hydraulic device 10 further comprises an operating member 14 that is movably coupled to the base member 12. Further in the first embodiment, the operating member 14 is pivotally coupled to the base member 12 about a pivot axis A1. Preferably, the operating member 14 includes an operating lever 14A that is pivotally coupled to the base member 12 about the pivot axis A1. In the first embodiment, the operating member 14 further includes an engagement member 14B, which will be discussed below. The operating member 14 (i.e., the operating lever 14A) is pivotable relative to the base member 12 between a non-operated or rest position NOP and an operated position OP about the pivot axis A1. In particular, the bicycle hydraulic device 10 includes a pivot shaft 16 defining the pivot axis A1. The pivot shaft 16 pivotally couples the operating member 14 to the base member 12. In the first embodiment, the operating lever 14A has a proximal end portion that is pivotally coupled to the base member 12 about the pivot axis A1, and a distal end portion that constitutes a free end of the operating member 14. Alternatively, the operating member 14 can be replaced with a push type operating member with a sliding rod that is slidably coupled to the base member 12.

As used herein, the term "non-operated or rest position" refers to a position at which a movable operating part such as the operating member 14 remains stationary in a state where the movable part is not operated by the user. The term "operated position" as used herein refers to a position at which the movable operating part such as the operating member 14 has been operated by the user to perform the operation of a bicycle component such as the hydraulic bicycle component BC1.

Here, the base member 12 includes a main body 18. In the first embodiment, the bicycle hydraulic device 10 is configured as a road shifter, in which case, the main body 18 is often called a bracket or a road shifter bracket. Basically, the main body 18 of the base member 12 includes a first end portion 18a, a second end portion 18b and a grip portion 18c. The base member 12 further comprises a mounting structure 20 to mount the base member 12 to the bicycle handlebar H. The base member 12 is a stationary member when mounted to the bicycle handlebar H. The bicycle hydraulic device 10 further comprises a grip cover 22 attached to the base member 12 to at least partly cover the base member 12. The grip cover 22 is made of a non-metallic material such as rubber. A rider sometimes grips the base member 12 (e.g., the grip portion 18c) and leans on the base member 12 (e.g., the grip portion 18c) during riding. The grip cover 22 can be omitted from the bicycle hydraulic device 10.

The first end portion 18a is configured to be mounted to the bicycle handlebar H. Specifically, the mounting structure 20 is mounted to the first end portion 18a to mount the base member 12 to the bicycle handlebar H. Preferably, the first end portion 18a has a curved end surface 18a1 that contacts the bicycle handlebar H when the base member 12 is mounted to the bicycle handlebar H by the mounting structure 20. Basically, the mounting structure 20 preferably includes a band clamp 24 and a tightening member 26. The tightening member 26 is coupled to the band clamp 24 and includes a mounting bolt 28 (FIG. 1) to clamp the bicycle handlebar H between the band clamp 24 and the curved end surface 18a1 of the first end portion 18a. The mounting structure 20 can include other structures which are similar to the band clamp 24 and which are used in a road shifter for mounting to a drop handlebar.

The second end portion 18b includes a pommel portion 18d that is disposed opposite to the first end portion 18a. The grip portion 18c is disposed between the first end portion 18a and the second end portion 18b. The pommel portion 18d extends forwardly and upwardly from the second end portion 18b in a mounting state where the base member 12 is mounted to the bicycle handlebar H. In the first embodiment, the first end portion 18a, the second end portion 18b and the grip portion 18c of the main body 18 are formed as a one-piece member. However, the main body 18 can be several pieces. For example, the pommel portion 18d can be a separate member from the grip portion 18c. Here, the main body 18 of the base member 12 is made of a resin material. For example, the main body 18 can be made of a polyacetal resin, a polyimide resin or any other suitable resin material.

Figure 3:
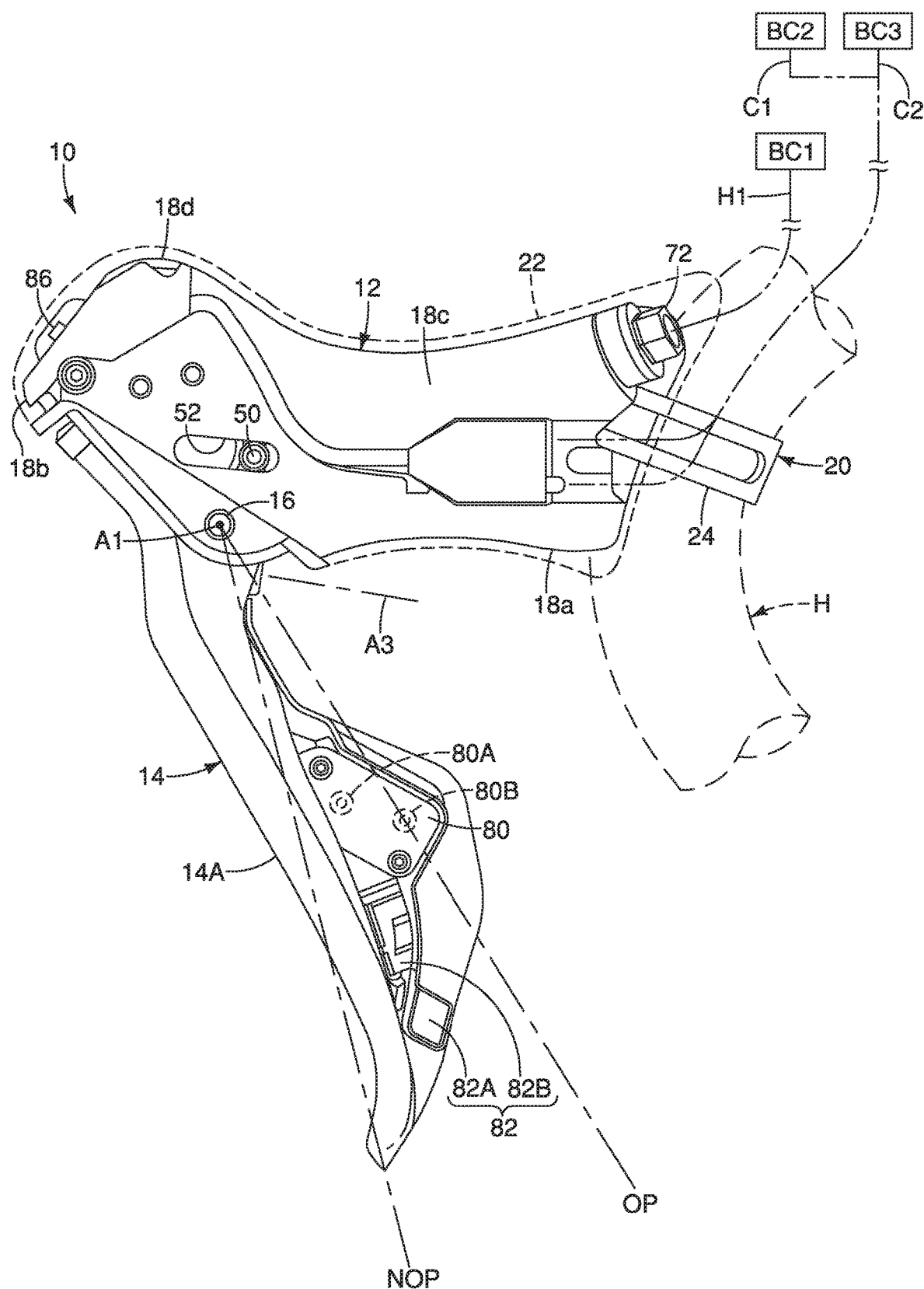
FIG. 3 is a side elevational view of the portion of the drop handlebar and the bicycle hydraulic device illustrated in FIG. 1 in which the operating member is in the non-operated position.
Figure 5:
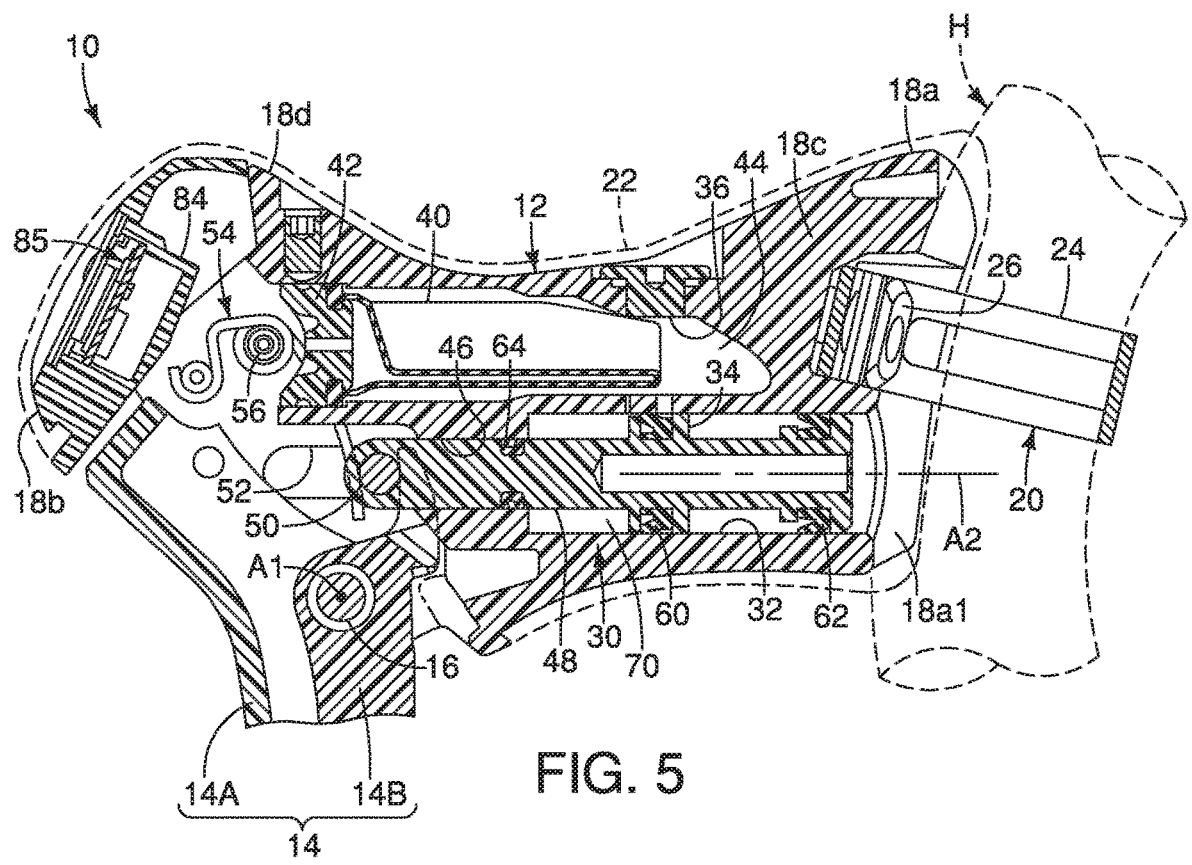
FIG. 5 is a partial cross-sectional view of the bicycle hydraulic device taken along line 5-5 of FIG. 4 in in which the operating member is in the non-operated position.
Figure 6:
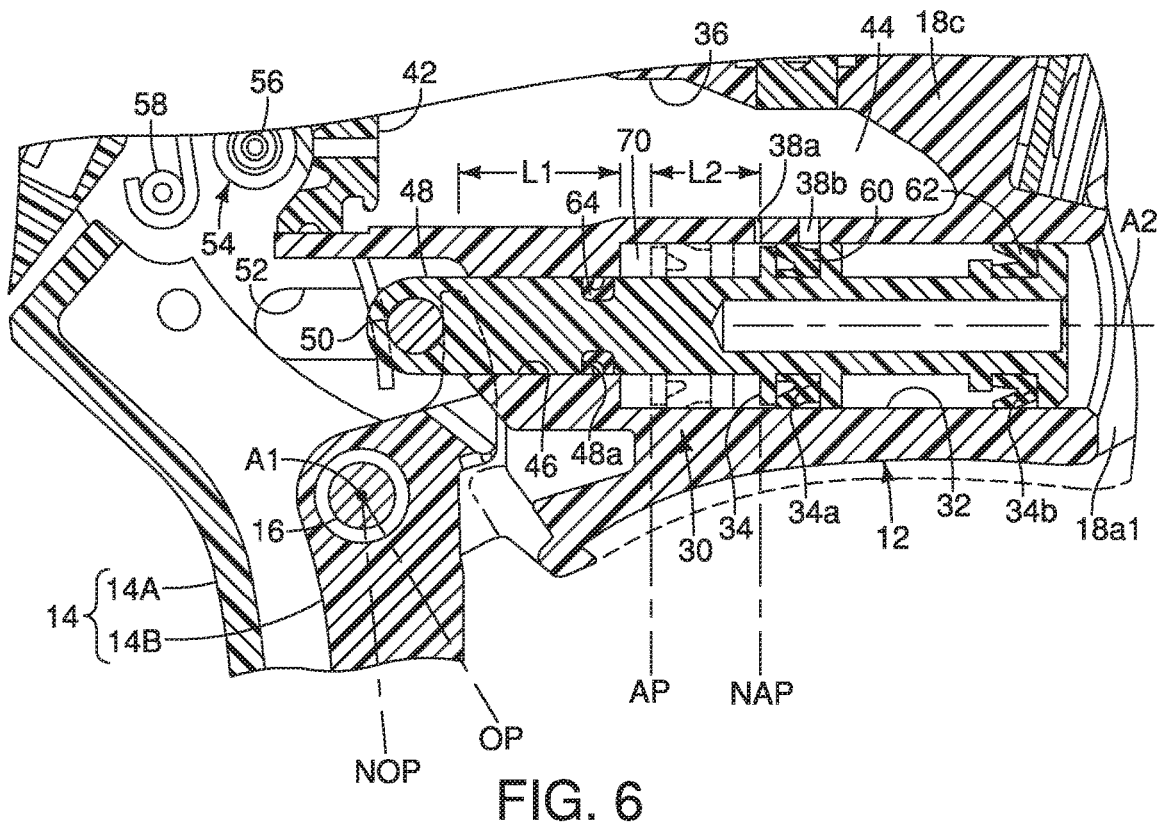
FIG. 6 is an enlarged cross-sectional view of a portion of the bicycle hydraulic device taken illustrated in FIG. 5 with the piston and guide rod in a non-actuated or rest position.
Figure 7:
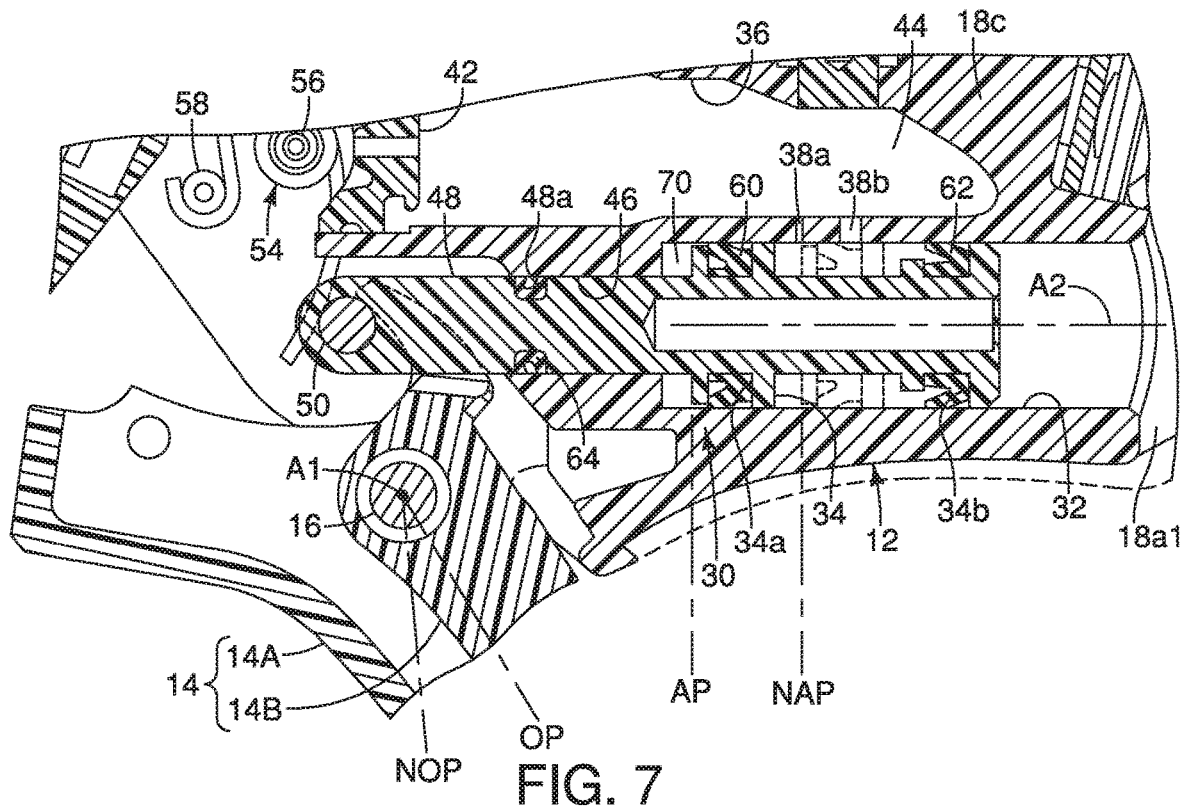
FIG. 7 is an enlarged cross-sectional view of a portion of the bicycle hydraulic device taken illustrated in FIG. 5 with the piston and guide rod in an actuated position in response to a movement of the operating member from the non-operated position to an operated position.

Now referring to FIGS. 5 to 7, the base member 12 is provided with a hydraulic unit 30 for supplying pressurized hydraulic fluid to the hydraulic bicycle component BC1 in response to movement of the operating lever 14A from the non-operated position NOP to the operated position OP (FIG. 3). Specifically, the main body 18 further includes a cylinder bore 32. The cylinder bore 32 is provided in the grip portion 18c. The cylinder bore 32 has a cylinder center axis A2. The cylinder bore 32 extends along the cylinder center axis A2. The cylinder bore 32 is arranged between the pivot axis A1 and the first end portion 18a. The cylinder bore 32 extends to the first end surface 18a*l* of the first end portion 18a. The cylinder bore 32 forms part of the hydraulic unit 30. The hydraulic unit 30 of the bicycle hydraulic device 10 further comprises a piston 34. The piston 34 is movably disposed in the cylinder bore 32. The piston 34 is slidably disposed in the cylinder bore 32 to reciprocate along the cylinder center axis A2. The piston 34 is operatively coupled to the operating member 14 to move in the cylinder bore 32 in response to a pivotal movement of the operating member 14. More specifically, the operating member 14 is operatively coupled to the piston 34 to pull the piston 34 in the cylinder bore 32 from a non-actuated or rest position NAP (FIG. 6) to an actuated position AP (FIG. 7) in response to a movement of the operating member 14. Preferably, the hydraulic unit 30 of the bicycle hydraulic device 10 further comprises a reservoir 36. Here, in the first embodiment, the base member 12 includes the reservoir 36 which is fluidly connected to the cylinder bore 32. Specifically, the reservoir 36 is fluidly connected to the cylinder bore 32 by a first connecting hole or port 38a and a second connecting hole or port 38b in a state where the piston 34 is positioned at the non-actuated position NAP (FIG. 6). The first connecting hole 38a is arranged closer to the operating member 14 than the second connecting hole 38b along the cylinder center axis A2.

As used herein, the term "non-actuated or rest position" refers to a position at which a movable actuated part such as the piston 34 remains stationary in a state where the movable operating part such as the operating member 14 is not operated by the user. The term "actuated position" as used herein refers to a position at which the movable actuated part has been actuated in response to the movement of the movable operating part such as the operating member 14.

As seen in FIG. 5, the reservoir 36 is provided in the grip portion 18c above the cylinder bore 32. In the first embodiment, the reservoir 36 extends parallel to the cylinder center axis A2. However, the position of the reservoir 36 is not limited to this position of the first embodiment. Here, the reservoir 36 is provided with a diaphragm 40 and a lid 42. The diaphragm 40 is provided in the reservoir 36 to be elastically deformable in the reservoir 36. The lid 42 is secured to the base member 12 to cover an end opening of the reservoir 36. The reservoir 36 and the diaphragm 40 define a reservoir chamber 44 that is filled with the hydraulic fluid such as mineral oil. Accordingly, the hydraulic unit 30 basically comprises the cylinder bore 32, the piston 34 and the reservoir 36. However, the hydraulic reservoir 36 can be omitted from the bicycle hydraulic device 10 or can be provided at the hydraulic bicycle component BC1, if needed and/or desired.

In the first embodiment, the bicycle hydraulic device 10 is configured to be a pull-type hydraulic operating device. However, the bicycle hydraulic device 10 can be configured to be a push-type hydraulic operating device. The non-actuated position NAP (FIG. 6) of the piston 34 corresponds to the non-operated position NOP of the operating lever 14A (FIG. 3). The actuated position AP (FIG. 7) of the piston 34 corresponds to the operated position OP of the operating lever 14A (FIG. 3).

In the first embodiment, as seen in FIGS. 5 to 7, the main body 18 further includes a guide bore 46, and the bicycle hydraulic device 10 further comprises a guide rod 48. The guide rod 48 is coupled to the piston 34 to move the piston 34. In other words, the guide rod 48 and the piston 34 move together as a unit in response to movement of the operating lever 14A. As seen in FIG. 6, the guide bore 46 has a longitudinal length L1 that is longer than a maximum stroke length L2 of the piston 34 in the cylinder bore 32. The longitudinal length L1 of the guide bore 46 is equal to or greater than five millimeters. The longitudinal length L1 of the guide bore 46 is equal to or smaller than thirty millimeters.

The guide rod 48 is movably disposed in the guide bore 46. The guide bore 46 of the main body 18 has a smooth guide surface. As used herein, the term "smooth" as used to modify "surface" means a surface roughness value of Rz 3.2 μm or less. The surface roughness value Rz of surface is a ten-spot average roughness determined from the sum of the average value of absolute values of the heights of five highest profile peaks and the depths of five deepest profile valleys measured in a vertical magnification direction from a mean line of a sampled portion (0.8 millimeters in the length direction of the guide bore 46).

In the first embodiment, the piston 34 and the guide rod 48 are a single member. The piston 34 is made of a resin material. The guide rod 48 is made of a resin material. For example, the guide rod 48 and the piston 34 can be made of a polyacetal resin, a polyimide resin or any other suitable resin material. While the guide rod 48 is integrally provided with the piston 34 as a one-piece unitary member in the first embodiment, the guide rod 48 can be a separate member from the piston 34. If the guide rod 48 is a separate member from the piston 34, the guide rod 48 can be movably coupled to the piston 34. If the guide rod 48 is a separate member from the piston 34, then the guide rod 48 can be made of a resin material and the piston 34 can be made of the same material as the guide rod 48 or a different material from the guide rod 48.

The guide rod 48 has a first end coupled to the piston 34, and extends from the piston 34 toward an opposite side of the first end portion 18a relative to the piston 34. The guide rod 48 has a second end that is provided with a coupling shaft 50 that is movably disposed in a pair of guide grooves 52 provided in opposite sides of the main body 18. The coupling shaft 50 extends parallel to the pivot axis A1, and perpendicular to the cylinder center axis A2. The coupling shaft 50 is engaged with the engagement member 14B to transmit an operation force applied to the operating lever 14A to the coupling shaft 50, and thus, move the piston 34 in the cylinder bore 32. The engagement member 14B is fixed at the proximal end portion of the operating lever 14A. While the engagement member 14B is illustrated as non-movably mounted to the operating lever 14A, it will be apparent that the engagement member 14B can be adjustably mounted to the operating lever 14A to adjust the non-operated or rest position NOP of the operating lever 14A.

Figure 8:
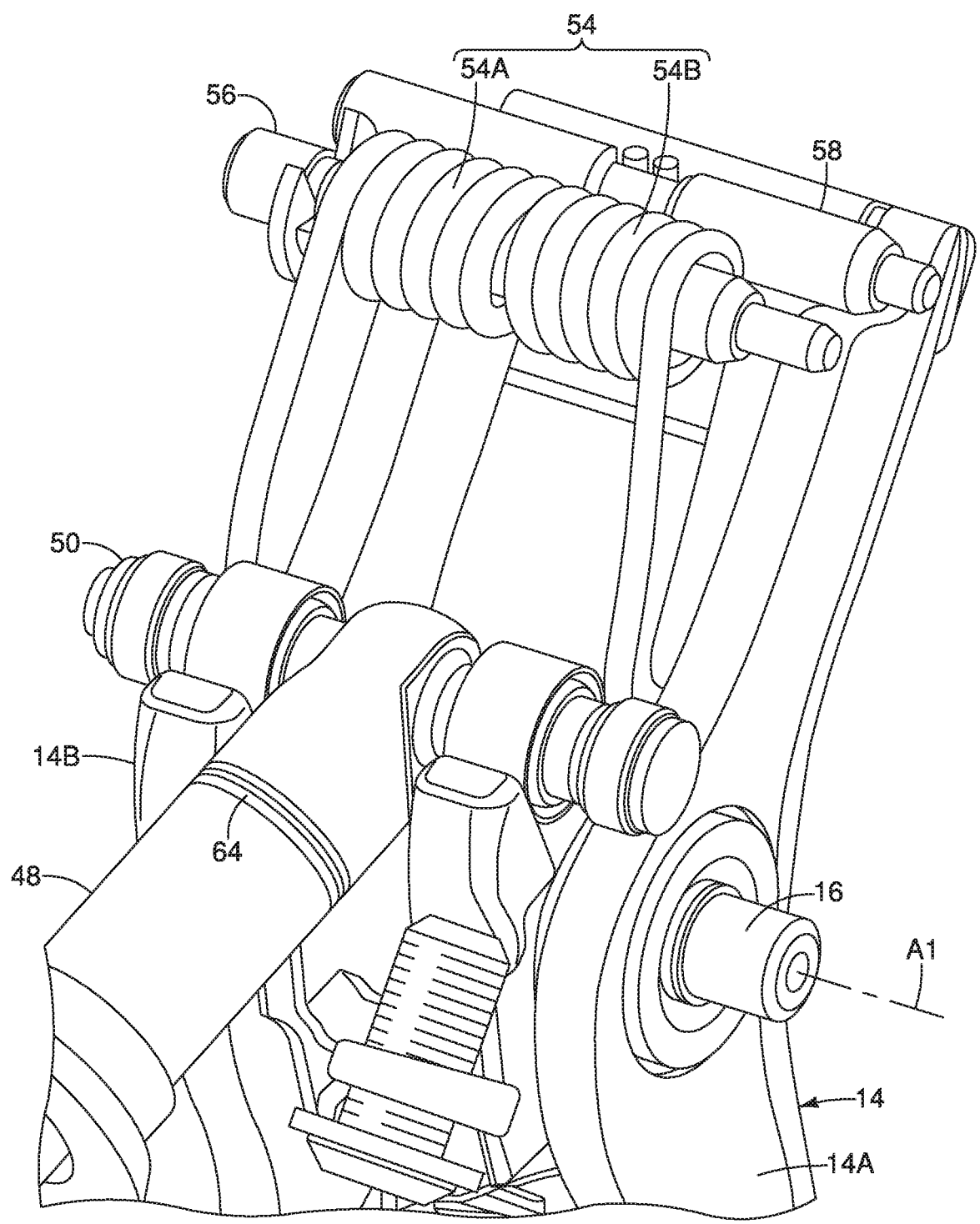
FIG. 8 is an enlarged perspective view of selected parts of the bicycle hydraulic device illustrated in FIG. 1 with the base member omitted.

The bicycle hydraulic device 10 further comprises a biasing element 54 to bias the piston 34 from the actuated position AP (FIG. 7) toward the non-actuated position NAP (FIG. 6). The biasing element 54 also functions to bias the operating member 14 from the operated position OP towards the non-operated or rest position NOP. In the first embodiment, the biasing element 54 is provided outside the cylinder bore 32. However, the biasing element 54 can be provided in the cylinder bore 32. In the first embodiment, as seen in FIG. 8, the biasing element 54 includes a pair of torsion coil springs 54A and 54B. The biasing element 54 is supported on a support shaft 56 that is mounted to the main body 18 of the base member 12. More specifically, each of the torsion coil springs 54A and 54B has a coiled portion disposed on the support shaft 56, a first free end contacting the coupling shaft 50, and a second free end contacting an abutment shaft 58 that is mounted to the main body 18 of the base member 12. However, the biasing element 54 can be other types of biasing elements such as one or more compression springs.

As seen in FIGS. 6 and 8, the bicycle hydraulic device 10 further comprises a piston seal ring 60 that is disposed on the piston 34 and in sliding contact with the cylinder bore 32. Specifically, the piston 34 has a piston recess 34a circumferentially provided on the piston 34, and the piston seal ring 60 is disposed in the piston recess 34a. In the first embodiment, the bicycle hydraulic device 10 further comprises a piston seal ring 62 that is disposed on the piston 34 and in sliding contact with the cylinder bore 32. Specifically, the piston 34 has a piston recess 34b circumferentially provided on the piston 34, and the piston seal ring 62 is disposed in the piston recess 34b. The piston seal ring 60 is spaced apart from the piston seal ring 62 along the cylinder center axis A2. The piston seal rings 60 and 62 are preferably elastomeric (e.g., rubber) O-rings having a uniform cross sectional profile.

The bicycle hydraulic device 10 further comprises a guide rod seal ring 64. The guide rod seal ring 64 is disposed on the guide rod 48 and in sliding contact with the guide bore 46. Specifically, the guide rod 48 has a guide rod recess 48a circumferentially provided on the guide rod 48, and the guide rod seal ring 64 is disposed in the guide rod recess 48a. The guide rod seal ring 64 is preferably an elastomeric (e.g., rubber) O-ring having a uniform cross sectional profile. The cylinder bore 32, the piston 34, the piston seal ring 60, and the guide rod seal ring 64 define a hydraulic chamber 70. The hydraulic chamber 70 is filled with a hydraulic fluid such as mineral oil. The hydraulic chamber 70 is fluidly connected to the reservoir chamber 44 via the first connecting hole 38a in a non-actuated state where the piston 34 is in the non-actuated position NAP (FIG. 6). The second connecting hole 38b provides fluid from the reservoir chamber 44 to a space between the piston seal rings 60 and 62 in the cylinder bore 32. The piston seal ring 60 interrupts communication between the hydraulic chamber 70 and the reservoir chamber 44 via the first connecting hole 38a when the piston 34 is moved from the non-actuated position NAP (FIG. 6) toward the actuated position AP (FIG. 7).

Figure 4:
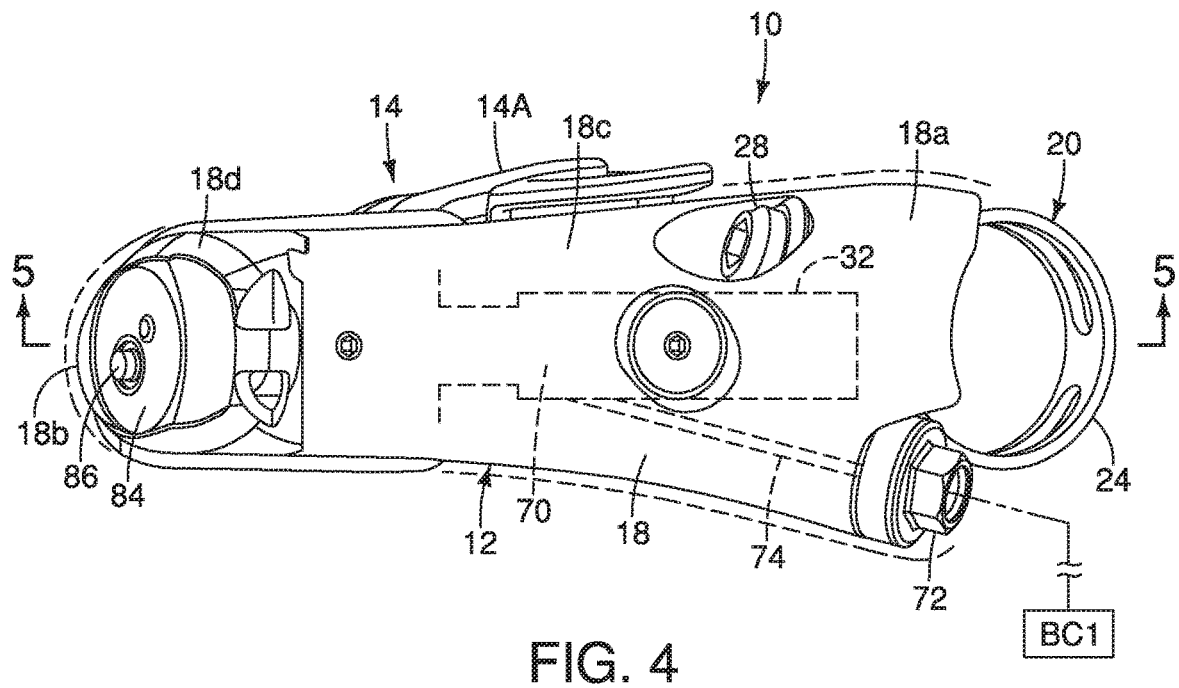
FIG. 4 is a top plan view of the bicycle hydraulic device illustrated in FIGS. 1 to 3.

As seen in FIG. 4, the bicycle hydraulic device 10 includes an outlet port 72 connected to the cylinder bore 32 to supply a hydraulic pressure to the hydraulic bicycle component BC1. The main body 18 of the base member 12 includes an outlet passageway 74 connecting the hydraulic chamber 70 to the outlet port 72. In other words, the hydraulic chamber 70 is connected to the hydraulic hose H1 via the outlet passageway 74 and the outlet port 72.

Referring back to FIGS. 1 to 3, the bicycle hydraulic device 10 further comprises a bicycle component operating unit 80 that is provided on one of the base member 12 and the operating member 14. Here, the bicycle component operating unit 80 is provided on the operating member 14. The bicycle component operating unit 80 is configured to output shift signals to the electrical bicycle component BC2. In the first embodiment, the bicycle hydraulic device 10 further comprises an additional operating member 82 for operating the bicycle component operating unit 80. The additional operating member 82 includes a first additional operating lever 82A that is pivotally coupled to one of the base member 12 and the operating lever 14A about an additional pivot axis A3. Here, the additional operating member 82 further includes a second additional operating lever 82B that is pivotally coupled to the operating lever 14A about the additional pivot axis A3. The bicycle component operating unit 80 includes a first electrical switch 80A and a second electrical switch 80B that are provided on one of the base member 12, the operating lever 14A and the first and second additional operating levers 82A and 82B. Here, the first and second electrical switches are provided on the operating lever 14A. The first electrical switch 80A is operated via the first additional operating lever 82A to output one of a downshift signal and an upshift signal. The second electrical switch 80B is operated via the second additional operating lever 82B to output other of the downshift signal and the upshift signal. The bicycle component operating unit 80 can be omitted from the bicycle hydraulic device 10.

Referring to FIG. 5, the bicycle hydraulic device 10 further comprises a bicycle component operating unit 84 that is provided on one of the base member 12 and the operating member 14. Here, the bicycle component operating unit 84 is provided on the base member 12. The bicycle component operating unit 84 includes an electrical switch 85. The bicycle component operating unit 84 is configured to output control signals to the electrical bicycle component BC3. In the first embodiment, the bicycle hydraulic device 10 further comprises an additional operating member 86 for operating the bicycle component operating unit 80. Here, the additional operating member 86 is a push button (i.e., a user operating portion) provided at the second end portion 18b. In this embodiment, the bicycle component operating unit 84 is attached to the pommel portion 18d, However, the position of the bicycle component operating unit 84 is not limited to this embodiment. The additional operating member 86 forwardly upwardly faces in the mounting state where the base member 12 is mounted to the bicycle handlebar H, The bicycle component operating unit 84 and the additional operating member 86 are covered by the grip cover 22. The additional operating member 86 is to be pushed via the grip cover 22. However, the additional operating member 86 can be exposed through the grip cover 22. The bicycle component operating unit 84 can be omitted from the bicycle hydraulic device 10.

Figure 9:
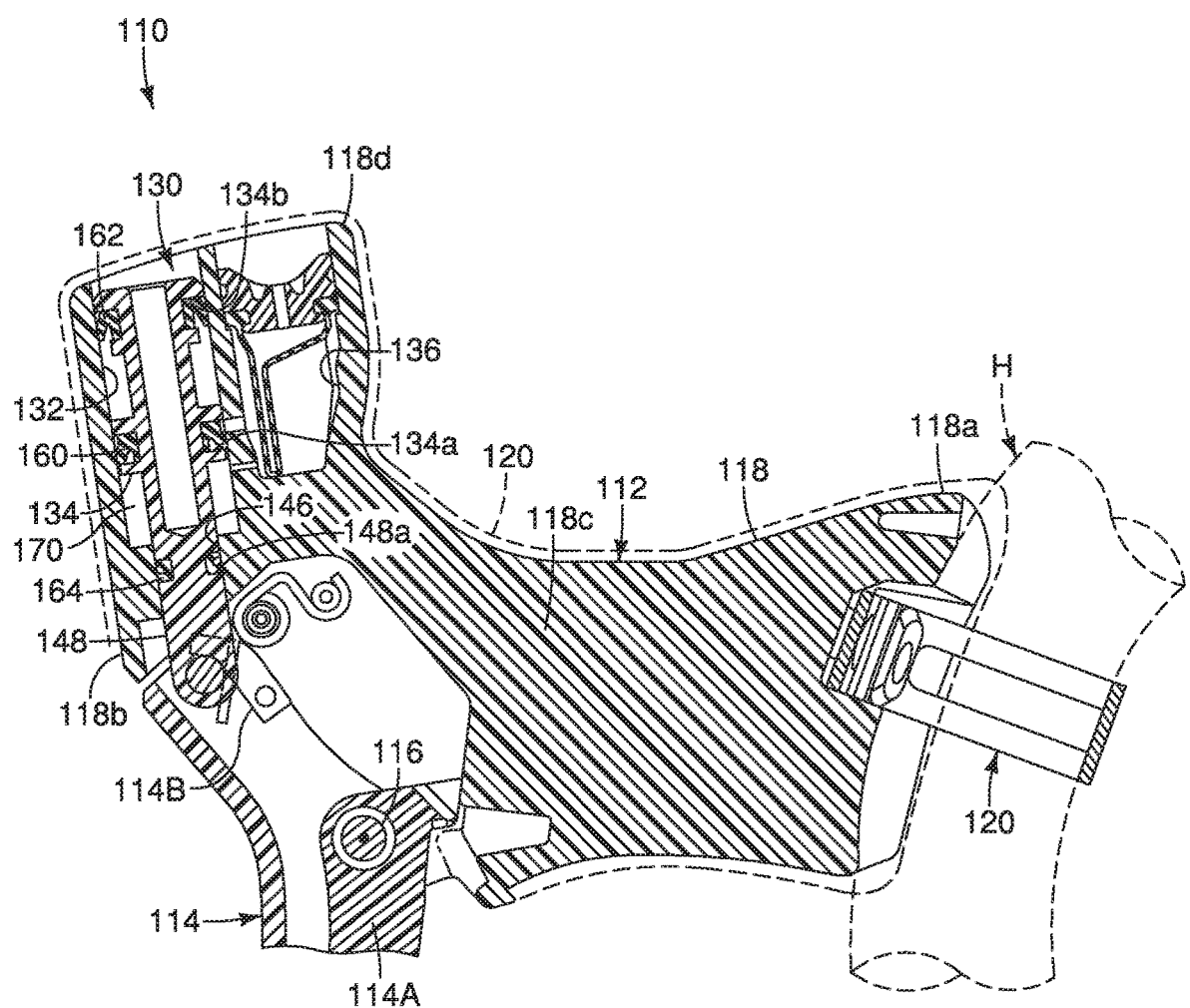
FIG. 9 is a partial cross-sectional view of a bicycle hydraulic device in accordance with a second embodiment.

Referring now to FIG. 9, a bicycle hydraulic device 110 is illustrated in accordance with a second embodiment. Here, in the second embodiment, the bicycle hydraulic device 110 is a bicycle component operating/actuating/control device. However, broadly speaking, basic features of the bicycle hydraulic device 110 can be applied to other bicycle hydraulic devices such as a bicycle hydraulic disc brake. Preferably, the bicycle hydraulic device 110 is configured to be mounted to the handlebar H in the same way as the first embodiment. Also, the bicycle hydraulic device 110 is operatively coupled to the hydraulic bicycle component BC1, and the electrical bicycle component BC2 in the same way as the first embodiment.

Here, in the second embodiment, the bicycle hydraulic device 110 comprises a base member 112 and an operating member 114. Preferably, the operating member 114 includes an operating lever 114A and an engagement member 114B. A pivot shaft 116 pivotally couples the operating member 114 to the base member 112 similar to the first embodiment. The base member 112 includes a main body 118 that is made of a resin material similar to the first embodiment. The bicycle hydraulic device 110 is configured as a road shifter. Basically, the main body 118 of the base member 112 includes a first end portion 118a, a second end portion 118b and a grip portion 118c. The second end portion 118b includes a pommel portion 118d that is disposed opposite to the first end portion 118a. The base member 112 further comprises a mounting structure 120 to mount the base member 112 to the bicycle handlebar H in the same way as the first embodiment. The bicycle hydraulic device 110 further comprises a grip cover 122 that is attached to the base member 112 to at least partly cover the base member 112.

The base member 112 is provided with a hydraulic unit 130 for supplying pressurized hydraulic fluid to the hydraulic bicycle component BC1 in response to movement of the operating lever 114A similar to the first embodiment. However, here, the hydraulic unit 130 is provided in the pommel portion 118d. In view of the similarities between the hydraulic units 30 and 130, the hydraulic unit 130 will only be brevity discussed and/or illustrated herein.

The hydraulic unit 130 basically comprises a cylinder bore 132, a piston 134 and a reservoir 136. The cylinder bore 132 is provided in the pommel portion 118d. The piston 134 and the reservoir 136 are also provided in the pommel portion 118d.

In the second embodiment, the main body 118 further includes a guide bore 146, and the bicycle hydraulic device 110 further comprises a guide rod 148. The guide rod 148 is coupled to the piston 134 to move the piston 134. The piston 134 is connected to the operating lever 114A by the guide rod 148. The guide rod 148 is movably disposed in the guide bore 146. The guide bore 146 of the main body 118 has a smooth guide surface with a surface roughness value of Rz 3.2 μm or less. The guide rod 148 and the piston 134 are made of a resin material.

The piston 134 has a piston recess 134a and a piston recess 134b. A piston seal ring 160 is disposed in the piston recess 134a, while a piston seal ring 162 is disposed in the piston recess 134h. The piston seal rings 160 and 162 are in sliding contact with the cylinder bore 132. The guide rod 148 has a guide rod recess 148a. A guide rod seal ring 164 is disposed in the guide rod recess 148a and in sliding contact with the guide bore 146. The seal rings 160 and 162 are preferably elastomeric (e.g., rubber) O-rings having a uniform cross sectional profile. The cylinder bore 132, the piston 134, the piston seal ring 160, and the guide rod seal ring 164 define a hydraulic chamber 170.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle hydraulic device. Accordingly, these directional terms, as utilized to describe the bicycle hydraulic device should be interpreted relative to a bicycle in an upright riding position on a horizontal surface and that is equipped with the bicycle hydraulic device. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle hydraulic device comprising:
    a base member including a main body having a cylinder bore and a guide bore;
    a piston movably disposed in the cylinder bore between a non-actuated position and an actuated position, the guide bore having a longitudinal length that is longer than a maximum stroke length of the piston in the cylinder bore;
    a pair of piston seal rings disposed on the piston and in sliding contact with the cylinder bore;
    a guide rod extending from the piston as a single member with the piston to move the piston so that the piston and the guide rod together form a one-piece member made of resin, the guide rod being movably disposed in the guide bore, the piston having a maximum diameter that is greater than a maximum diameter of the guide rod;

a guide rod seal ring disposed on the guide rod and in sliding contact with the guide bore, the guide rod having a guide rod recess, the guide rod seal ring being disposed in the guide rod recess so to move with the guide rod when the piston moves between the non-actuated position and the actuated position, the piston having a pair of piston recesses, each of the piston recesses defining a maximum diameter of the piston, one of the pair of piston seal rings being disposed in a respective one of the piston recesses, the pair of piston seal rings being spaced from each other along a longitudinal length of the piston, a part of the piston separating the piston seal rings having another diameter that is less than the maximum diameter and the same as the maximum diameter of the guide rod, the part extending between the pair of piston recesses and contacting each of the pair of piston recesses; and an operating member movably coupled to the base member and operatively coupled to the piston to pull the piston in the cylinder bore from a non-actuated position to an actuated position in response to a movement of the operating member, the guide rod having a first end coupled to the piston and a second end portion mechanically coupled to the operating member.

2. The bicycle hydraulic device according to claim 1, wherein
the guide rod is made of a resin material.

3. The bicycle hydraulic device according to claim 1, wherein
the main body of the base member is made of a resin material.

4. The bicycle hydraulic device according to claim 1, wherein
the piston and the guide rod are a single member.

5. The bicycle hydraulic device according to claim 1, wherein
the guide bore has a longitudinal length that is equal to or greater than five millimeters.

6. The bicycle hydraulic device according to claim 1, wherein
the guide bore has a longitudinal length that is equal to or smaller than thirty millimeters.

7. The bicycle hydraulic device according to claim 1, wherein
the guide bore of the main body has a smooth guide surface.

8. The bicycle hydraulic device according to claim 1, wherein
the base member includes a first end portion is configured to be mounted to a bicycle handlebar, a second end portion including a pommel portion disposed opposite to the first end portion, and a grip portion disposed between the first end portion and the second end portion.

9. The bicycle hydraulic device according to claim 8, wherein
the cylinder bore is provided in the grip portion.

10. The bicycle hydraulic device according to claim 8, wherein
the cylinder bore is provided in the pommel portion.

11. The bicycle hydraulic device according to claim 1, wherein
the base member includes a reservoir fluidly connected to the cylinder bore and is disposed over the cylinder bore.

12. The bicycle hydraulic device according to claim 1, wherein
the operating member is pivotally coupled to the base member about a pivot axis.

13. The bicycle hydraulic device according to claim 1, wherein
a bicycle component operating unit provided on one of the base member and the operating member.

14. The bicycle hydraulic device according to claim 13, further comprising
an additional operating member operating the bicycle component operating unit.

15. The bicycle hydraulic device according to claim 14, wherein
the operating member includes an operating lever that is pivotally coupled to the base member about a pivot axis,
the additional operating member includes an additional operating lever pivotally coupled to one of the base member and the operating lever about an additional pivot axis, and
the bicycle component operating unit includes an electrical switch that is provided on one of the base member, the operating lever and the additional operating lever.

* * * * *